United States Patent [19]

MacDiarmid et al.

[11] Patent Number: 5,312,686
[45] Date of Patent: May 17, 1994

[54] PROCESSABLE, HIGH MOLECULAR WEIGHT POLYANILINE AND FIBERS MADE THEREFROM

[75] Inventors: Alan G. MacDiarmid, Drexel Hill; Elliot Scherr; Xun Tang, both of Philadelphia, all of Pa.

[73] Assignee: Trustees of University of Pennsylvania, Philadelphia, Pa.

[21] Appl. No.: 117,502

[22] Filed: Sep. 7, 1993

Related U.S. Application Data

[60] Division of Ser. No. 950,414, Sep. 23, 1992, Pat. No. 5,258,474, which is a division of Ser. No. 768,352, Sep. 30, 1991, Pat. No. 5,177,187, which is a continuation of Ser. No. 306,448, Feb. 3, 1989, abandoned.

[51] Int. Cl.$^5$ .............................. C08G 73/00
[52] U.S. Cl. .................... 428/364; 252/500; 524/606; 525/540; 528/422; 528/480
[58] Field of Search ............ 428/364; 252/500; 524/606; 525/540; 528/422, 480

[56] References Cited

U.S. PATENT DOCUMENTS

| | | | |
|---|---|---|---|
| 3,306,875 | 2/1967 | Hay | 528/212 |
| 4,798,685 | 1/1989 | Yaniger | 528/422 |
| 4,806,271 | 2/1989 | Yaniger et al. | 252/500 |
| 4,851,487 | 7/1989 | Yaniger et al. | 525/540 |

OTHER PUBLICATIONS

A. G. MacDiarmid, et al. "Conducting Polymers," Holland 1987, p. 105.
S. Wang et al. "Synth. Met." vol. 16, 1986, p. 99.
J. P. Traverse et al. "Mol. Cryst. Liq." vol. 121, (1985) pp. 195–199.
M. Angelopoulos et al. "Synth. Met." vol. 21, (1987) pp. 21–30.
M. Angelopoulos et al. "Mol. Cryst. Liq. Cryst." 1988, vol. 160, pp. 151–163.
Andreatta et al., "Electrically Conductive Fibers Polyaniline Spun from Solutions in Concentrated Sulfuric Acid", Synth Met. 26: 383–389 (1988).
Shenglong et al., "Polymerization of Substituted Aniline And Characterization of the Polymers Obtained", Synth Met. 16: 99–104 (1986).

Primary Examiner—John Kight, III
Assistant Examiner—Terressa M. Mosley
Attorney, Agent, or Firm—Woodcock Washburn Kurtz Mackiewicz & Norris

[57] ABSTRACT

Substantially amorphous, high molecular weight polyaniline which is processable into shaped articles such as fibers is disclosed. Polyaniline base made by standard procedures is subjected to extraction to remove impurities and lower molecular weight fractions. The resulting high molecular weight base, which is partially crystalline and insoluble in NMP and concentrated $H_2SO_4$, is converted to an amorphous material soluble in NMP and concentrated $H_2SO_4$, by a two step process involving conversion to a salt, and reconversion to a base. Fibers prepared from the high molecular weight material exhibit conductivities in the range of about 50 to 100 S/cm.

15 Claims, No Drawings

PROCESSABLE, HIGH MOLECULAR WEIGHT POLYANILINE AND FIBERS MADE THEREFROM

This is a division of application Ser. No. 950,414, filed Sep. 23, 1992, now allowed, U.S. Pat. No. 5,258,472, which in turn is a division of Ser. No. 768,352 filed Sep. 30, 1991, now issued, U.S. Pat. No. 5,117,187, which in turn is a continuation of Ser. No. 306,448 filed Feb. 3, 1989, now abandoned, Oct. 30, 1991.

BACKGROUND OF THE INVENTION

This invention relates to methods for preparing processable high molecular weight polyaniline, to the processable polyaniline itself, to methods of preparing conductive fibers and films therefrom, and to such fibers and films and to conductive fiber composites.

Because of its excellent stability and the relatively high levels of electrical conductivity of certain forms of the material, much attention has recently been directed to polyaniline. The base form of the polymer in the emeraldine oxidation state ($y=0.5$), hereinafter referred to as "emeraldine base" or "polyaniline base" can be represented by the formula

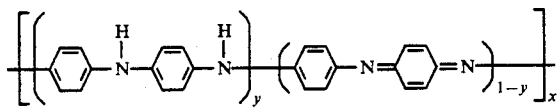

which contains equal numbers of alternating reduced,

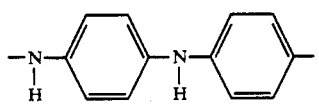

and oxidized,

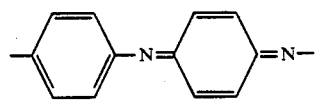

repeat units. The polymer can be protonated (or "doped") by dilute aqueous protonic acids such as HCl to produce the corresponding salt (A=anion):

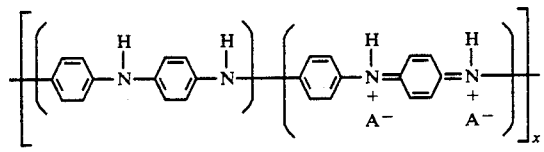

The polymer so obtained exhibits conductivities of about 1–5 S/cm, as compressed pellets of this powder, when approximately half of its nitrogen atoms are protonated as shown above.

For many useful applications of the conducting polyaniline polymers, it is necessary that they in some way be processable, i.e., capable of being converted into shaped articles such as fibers, films and fiber composites. It has been disclosed that free-standing films of emeraldine acetate (conductivity of about 0.5-2 S/cm) can be cast from solutions of emeraldine base in 80% aqueous acetic acid. M. Angelopoulos, A. Ray, A. G. MacDiarmid and A. J. Epstein, *Synth. Met.*, 21, 21–30 (1987). M. Angelopoulos, G. E. Asturias, S. P. Ermer, A. Ray, E. M. Scherr, A. G. MacDiarmid, M. Akhtar, Z. Kiss and A. J. Epstein, *Mol. Cryst. Liq. Cryst.*, 1988, Vol. 160, pp. 151-163, disclose that the best solvent for producing high quality free-standing films of emeraldine base is 1-methyl-2-pyrrolidinone (NMP), and that the mechanical properties of films cast from NMP are greatly superior to those of films cast from 80% acetic acid as previously described.

It has recently been disclosed that polyaniline may be successfully processed into monofilaments from solutions in concentrated sulfuric acid. A. Andreatta, Y. Cao, J. C. Chiang, A. J. Heeger and P. Smith, "Electrically Conductive Fibers of Polyaniline Spun from Solutions in Concentrated Sulfuric Acid," *Synth Met.*, 26 (1988) pp 383-389. The polyaniline derived from sulfuric acid solutions (up to 20% w/w) is disclosed as displaying sharp X-ray reflections, indicative of a significant degree of crystallinity, and the electrical conductivity of as-spun, washed and dried fibers was in the range from 20–60 S/cm. Andreatta et al. estimate that the molecular weight of the polyaniline used to prepare their fibers is between 12,000 and 40,000.

It has been disclosed to remove impurities and/or low molecular weight fractions from emeraldine base by extraction with solvents such as THF, DMSO, pyridine, $CH_3CN$, 80% acetic acid and 60% formic acid. A. G. MacDiarmid, J. C. Chiang, A. F. Richter, N. L. D. Somasiri, "Conducting Polymers", Luis Alcacer (ed.), Reidel Publ, Dordrecht, Holland, 1987, 105; M. Angelopoulos et al., *Mol. Cryst. Liq. Cryst.*, Id ; S. Wang, F. Wang, X. Ge, *Synth. Met.*, 16 (1986) 99; J. P. Travers, J. Chroboczek, F. Devreux, F. Genoud, M. Nechstein, A. Syed, B. M. Genies, C. Tsintavis, *Mol. Cryst. Liq. Cryst.*, 121 (1985) 195-199.

SUMMARY OF THE INVENTION

The present inventors have found that a substantially crystalline, highly purified, form of polyanilne base with high conductivity when doped (at least about 13 S/cm) can be obtained by extraction of emeraldine base with, e.g., THF followed by NMP. The resulting material is partially crystalline and substantially insoluble in NMP and concentrated $H_2SO_4$. This invention relates to such polyaniline base and to the method of preparing it. It is very desirable to find ways to process such highly-purified material into articles such as fibers and films.

The present inventors have also found a method for preparing high molecular weight polyaniline which is substantially amorphous and substantially soluble in solvents such as NMP and concentrated $H_2SO_4$. The substantially amorphous, high molecular weight polyanline, when dissolved in NMP, exhibits two peaks upon gel permeation chromatography, the major peak exhibiting a molecular weight of at least about 300,000. This invention therefore relates to such substantially amorphous high molecular weight polyaniline base and to a method of preparing such polyaniline base by providing highly purified, partially crystalline polyaniline base, substantially converting said base to a protonic acid salt, and substantially reconverting said salt back to a base.

The substantially amorphous high molecular weight polyaniline base of this invention is soluble in solvents such as NMP and concentrated sulfuric acid, and is therefore easily processable. This invention therefore further relates to the processing of such high molecular weight base into films and fibers. For example, the amorphous high molecular weight base may be drawn into fibers in a variety of coagulating solutions, including aqueous solutions of NMP or HCl. Depending on the nature of the coagulating solution, the resulting fiber will be doped (HCl solution) or not doped (NMP solution). Advantageously, the conductivity of the fiber can be controlled by varying the concentration of the coagulating or doping solution. Fibers of polyaniline have been made in this way, which fibers exhibit conductivities in the range of 50–100 S/cm.

DETAILED DESCRIPTION OF THE INVENTION

The high molecular weight amorphous polyaniline base of this invention can be prepared from emeraldine base synthesized via known methods. See, for example, MacDiarmid, A. G., Chiang, J.-C., Richter, A. F., Somasiri, N. L. D., Epstein, A. J., "Conducting Polymers", Luis Alcacer (ed.), Reidel Publ, Dordrecht, Holland, 1987, 105, the disclosure of which is hereby incorporated by reference. Generally, ammonium peroxydisulfate in 1M HCl is added to aniline also dissolved in 1M HCl, and the resulting solution maintained at a temperature below 5° C. Precipitate is collected and washed with 1M HCl to yield emeraldine hydrochloride. The hydrochloride salt may be converted to emeraldine base by treatment with 0.1M NH$_4$OH.

The term "polyaniline" as used herein is intended to encompass ring-substituted derivatives of polyaniline, for example polytoluidine and poly-o-(ethoxy)aniline. These derivatives may be synthesized from the corresponding substituted anilines by oxidative polymerization using (NH$_4$)$_2$S$_2$O$_8$ as described above for the parent polyaniline. The term "polyaniline" is also intended to encompass N-substituted derivatives of polyaniline containing organic groups, for example, methyl groups, attached to the nitrogen of the polyaniline chain.

Low molecular weight fractions and impurities can be removed from the polyaniline base prepared as described above by extraction with solvents such as THF, DMSO, CH$_3$CN, 80% acetic acid, 60% formic acid and the like. It has been found, for example, that extraction of emeraldine base with an organic ether such as THF, followed by further extraction with an amine type organic solvent such as NMP, results in removal of approximately 20% by weight of the polyaniline base. The removed portion consists of impurities and low molecular weight material. Such extraction treatment also serves to render the remaining 80% by weight of the polyaniline base (referred to hereinafter as the "purified polyaniline base") insoluble in NMP and concentrated sulfuric acid. Polyaniline base which is not so purified ("non-purified polyaniline base") is substantially soluble in NMP and concentrated sulfuric acid, at least about 1 gram of the untreated base dissolving in 100 ml NMP and at least about 10 grams of the untreated base dissolving in 100 g concentrated sulfuric acid.

The purified polyaniline base prepared as described above is partly crystalline as confirmed by X-ray diffraction studies. The non-purified polyaniline base is substantially amorphous by identical X-ray diffraction studies. The purified polyaniline base prepared as described above has an elemental C,H,N analysis in excellent agreement with its proposed composition, unlike non-purified polyaniline base.

Unfortunately, the purified polyaniline base is insoluble in solvents such as NMP and concentrated H$_2$SO$_4$, possibly because of its partial crystallinity, and therefore has limited processability. It has now been found, however, that this partially crystalline, purified form of polyaniline base can be converted, by a two step process, to a substantially amorphous (as determined by X-ray diffraction techniques) material, soluble in solvents such as NMP and concentrated H$_2$SO$_4$ and therefore easily processable.

In the first step of this conversion process, the polyaniline base material is contacted with an aqueous solution of a protonic acid to convert the material to the corresponding polyaniline salt. Such protonic acids include but are not limited to hydrochloric acid and acetic acid, and generally have a pH of less than about 2. In a preferred embodiment, the polyaniline base is contacted with 1M HCl. Substantial conversion to the salt should occur over a period of about one to sixty hours.

In the second step of the conversion process, the polyaniline salt is converted back to base form. Conversion to the base may be accomplished by contacting the salt with an aqueous solution of a hydroxylic base, for example, ammonium, potassium or sodium hydroxide. The base should generally have a pH equal to or greater than about 8. In a preferred embodiment, the polyaniline salt is contacted with 0.1M NH$_4$OH in an air-free environment. Substantial conversion back to the base should occur over a period of about one to sixteen hours.

Surprisingly, this reconverted base is substantially amorphous by X-ray diffraction techniques and soluble in solvents such as concentrated H$_2$SO$_4$ and amine type organic solvents such as NMP. NMP is an especially preferred solvent for the polyaniline because most plasticizers which one might desire to add to the polymer are also soluble in NMP.

A gel permeation chromatographic study using an NMP solution in an Ultrastyragel Linear THF column (30 cm) calibrated with monodisperse polystyrene of this re-solubilized polyaniline base gave two peaks corresponding to molecular weights of about 36,000 (45%) and about 320,000 (55%). By contrast, an NMP solution of the polyaniline base before the THF/NMP extraction/purification process gave two peaks corresponding to molecular weights of about 31,000 (86%) and about 390,000 (14%), respectively. Also, by contrast, the polyaniline base obtained from the polyaniline synthesized by the method of Andreatta et. al. gave, by the same G.P.C. column, peaks corresponding to molecular weights of about 17,000 (57%) and 250,000 (55%). It is well known that high molecular weights lend advantageous properties to polymers.

The substantially amorphous high molecular weight polyaniline base, by virtue of its solubility in solvents such as NMP, is easily processable into shaped articles such as films and fibers. To the present inventors, knowledge, this is the first time such a processable high molecular weight polyaniline has been prepared.

Methods for processing polymer solutions into films and fibers are well known in the art. For example, films may be made by spreading a viscous solution of the polyaniline onto a polished surface and removing solvent from the film, e.g., either by evaporation or by immersion of the film in a coagulating bath as described below.

Of special interest, however, are fibers made from the substantially amorphous high molecular weight polyaniline base of this invention. Such fibers may be made by spinning methods also known in the art. Generally, a viscous solution of the polyaniline is forced through a spinerette into a liquid bath, also referred to herein as a coagulating bath. The coagulating bath is generally a nonsolvent for the polymer, precipitating it from solution as the solvent diffuses outward into the nonsolvent.

To prepare fibers from the high molecular weight polyaniline of this invention, suitable coagulating baths include water and aqueous solutions of protonic acids such as HCl. When the coagulating bath is acidic, the resulting fibers are doped. By adjusting the acidity of the bath, e.g., from about $10^{-5}$ to 6 mole HCl, one can conveniently adjust the degree of conductivity of the final fiber. Highly conductive fibers (conductivities in the range of about 50-100 S/cm) have been obtained by spinning high molecular weight polyaniline of this invention in 1M HCl.

It has also been found that a coagulating bath comprising a mixture of solvent and non-solvent for the polyaniline may be utilized. For example, the coagulating bath can comprise a mixture of NMP (solvent) and water or aqueous HCl (non-solvents) to effect a slower, more controlled precipitation of the polyaniline. Generally, in such solvent/non-solvent mixtures, the solvent can comprise from 0% up to about 30% w/w of the coagulating bath, the ideal amount depending, of course, on the specifics of the spinning process. Fibers prepared in non-acidic baths, such as water or mixtures of water and NMP are in base form and generally have a conductivity of less than about $10^{-10}$ S/cm. These fibers may be chemically or electrochemically doped according to methods known in the art to render them electrically conductive to the desired degree. See, for example, the disclosures of U.S. Pat. Nos. 4,204,216., 4,222,903, 4,321,114 and 4,442,187, the disclosures of which are hereby incorporated by reference.

Composite fibers may be prepared using the purified polyaniline base of this invention. Core fibers, such as but not limited to fibers of glass, nylon or polypropylene, can be coated with a solution of the polyaniline base and subjected to conditions under which the solvent is removed from the polyaniline solution. For example, the coated fiber could be placed in a coagulating bath as described above. Optionally, the coated fiber might be stretched while it is in the coagulating bath to effect simultaneous orientation of the core fiber and the polyaniline coating.

Non-conductive high molecular weight polyaniline base powders, films or other shaped articles may also be doped as discussed to render them electrically conductive. Tests indicate that when the high molecular weight amorphous polyaniline base of this invention, in the form of fibers, is doped with 1M HCl, it exhibits a conductivity of about 50-100 S/cm.

Conductive high molecular weight polyaniline fibers prepared according to this invention have a multitude of uses. For example, they might be woven into cloths which would have antistatic properties. Such cloths or the fibers themselves might be used as radar absorbing materials. The fibers might be impregnated in non-conducting conventional plastics to impart mechanical strength and controlled conductivity for use, for example, in construction of airplane fuselages in place of metal.

The compositions of matter and processes of this invention are further illustrated in the following examples which are not intended to be limiting of this invention.

EXAMPLE 1

Polyaniline base powder was synthesized using the method outlined by MacDiarmid et al. in "Conducting Polymers", Luis Alcacer, ed., Reidel Publications, Dordrecht, Holland (105-120 (1987). The polyaniline base powder so prepared gave an elemental analysis:

Found: C, 78.95%; H, 4.89%; N, 14.91% Total 98.75%

Calc.: C, 79.55%; H, 4.98%; N, 15.47% Total 100.00%

Its conductivity after doping with 1M HCl was 4.8 S/cm. The polyaniline base powder so prepared was exhaustively extracted, first with tetrahydrofuran (THF) until the extracted solvent was colorless, and then with 1-methyl-2-pyrrolidinone (NMP) until the extract was essentially colorless.

THF Extract (after removal of THF)

Found: C, 77.05%; H, 5.00%; N, 14.99% Total: 97.02%

Calc.: C, 79.61%; H, 4.92%: N, 15.47% Total: 100.00%

(ii) GPC Mol. Wt.

1st peak: 310,000 (12%)

2nd peak: 3,000 (88%)

(iii) Conductivity on doping with HCl: 0.2 S/cm (iv) Cyclic voltammogram in 1M $HClO_4$ exhibited a strong central peak, $E_{\frac{1}{2}}=0.47$ V, which is not present in pure polyaniline base Polyaniline Base (after extraction with THF and NMP)

(i) Elemental Analysis

Found: C, 79.16%; H, 4.92%; N, 15.31% Total: 99.39%

Calc. C, 79.55%; H, 4.98%; N, 15.47% Total:100.00%

(ii) Conductivity on doping with 1M HCl: greater than about 13 S/cm

The polyaniline base obtained after the THF/NMP extraction was insoluble in NMP and quantitatively insoluble in concentrated $H_2SO_4$ and was confirmed to be partially crystalline by X-ray diffraction studies, whereas the polyaniline base powder before the extraction was soluble in NMP and concentrated $H_2SO_4$ and had been confirmed to be substantially amorphous using identical X-ray diffraction techniques.

The NMP-insoluble polyaniline base powder was treated with 1M HCl for 55 hours with stirring, then dried, and then treated with 0.1M $NH_4OH$ for 16 hours with stirring. Upon such treatment, the previously NMP- and concentrated $H_2SO_4$- insoluble polyanilne base powder became amorphous (confirmed by X-ray diffraction studies) and was soluble in NMP and in concentrated $H_2SO_4$.

EXAMPLE 2

One gram of the amorphous high molecular weight polyaniline prepared in Example 1 was dissolved in 100 ml of NMP. This solution was stirred for one hour and then filtered through a Whatman #2 filter and placed on a Rotavapor (Buchi model #R110) under dynamic vacuum for approximately 90 minutes using a dry ice-/acetone cooling bath at the receiving flask and at a temperature of about 50° C. to produce about 5 ml of a very viscous blue solution. The viscous solution was placed between two metal spatulas and immersed into an aqueous coagulating bath at room temperature. By separating the spatulas inside the coagulating bath, polyaniline fibers were drawn.

Polyaniline base fibers were obtained when the coagulating bath consisted of 100% deionized $H_2O$ or a 30% NMP/70% $H_2O$ mixture. These base fibers can be doped with any dopant which is used for polyaniline base. Polyaniline hydrochloride salt fibers were obtained directly from the viscous base solution by using 1M HCl as the coagulating bath. The as-made fibers were left in their respective coagulating baths for about 20 hours to remove most of the NMP solvent since NMP is miscible with aqueous solutions. In addition, this 20-hour period ensured complete doping of the HCl-salt fibers. These fibers were then dried under dynamic vacuum for 40 hours.

The fibers so made range in length from 3–15 cm and in width from 25–50 um. The dried fibers exhibited good mechanical properties and could be bent in half without breaking. Scanning electron micrographs (SEM) revealed that the fibers possess a smooth, clean and even surface. Conductivity for the HCl doped fibers ranged from 50–100 S/cm, the undoped base fibers exhibited conductivity less than about $10^{-10}$ S/cm. Preliminary X-ray diffraction studies indicate that the fibers were partially crystalline in both the base and salt forms.

EXAMPLE 3

Composite fibers consisting of a central core of (i) nylon, (ii) polyethylene, (iii) polypropylene, and (iv) glass, surrounded by conducting polyaniline, were prepared as follows.

One gram of finely ground polyaniline base powder was added to 100 ml of NMP to yield a 1% solution. This was stirred for about 1 hour and filtered through a Whatman #41 filter paper on a Buchner funnel. The filtered solution was placed in a pear shaped flask and rotary evaporated at about 50° C. to yield 30 mls of a significantly thicker solution. This solution was placed in a petri dish.

A strand of glass wool approximately 5 cm in length was pulled through the NMP solution. This was then placed in a solution of 1M HCl to dope the coating of polyaniline base surrounding the fiber. This same procedure was repeated with a thin sliver of polypropylene film, and a piece of monofilament nylon fiber, yielding similar results.

The above procedure was repeated using a thin sliver of polypropylene except that the polypropylene coated sliver was stretched upon placing it in the coagulation solution in order to induce simultaneous orientation of the core substrate and the polyaniline coating.

EXAMPLE 4

As noted previously, Andreatta et. al. disclose the preparation of polyaniline fibers in *Synth. Met.*, 26 (1988), pp 383–389. By way of comparison, the molecular weight of polyaniline base prepared as disclosed by Heeger et al. was determined by gel permeation chromatography using an Ultrastyragel Linear THF column (30 cm) calibrated with monodisperse polystyrene, the same method used to determine molecular weight of the purified polyaniline base disclosed herein. GPC of the polyaniline bases exhibits two peaks. In the case of the Andreatta et. al. material, the peaks corresponded to molecular weights of about 250,000 (43%) and about 17,000 (57%). The purified polyaniline base prepared as in Example 2 gave peaks corresponding to about 320,000 (55%) and about 36,000 (45%).

What is claimed is:

1. A method of preparing fibers of high molecular weight polyaniline comprising drawing a viscous solution of an amorphous polyaniline base having a molecular weight of at least about 300,000 as determined by gel permeation chromatography into a fiber in a coagulating bath selected from the group consisting of non-solvents for said polyaniline and mixtures of solvents and non-solvents for said polyaniline, and allowing the drawn polyaniline to precipitate.

2. The method of claim 1 wherein said coagulating bath is selected from water, aqueous solutions of protonic acids, and mixtures of either with a solvent for polyaniline.

3. The method of claim 2 where said coagulating bath is aqueous hydrochloric acid having a concentration up to about 6M.

4. The method of claim 3 where the fibers so produced exhibit a conductivity of up to about 50–100 S/cm.

5. The method of claim 1 wherein said coagulating bath is selected from the group consisting of mixtures of water and NMP and mixtures of aqueous HCl and NMP.

6. The method of claim 5 wherein said NMP comprises up to about 70% of the coagulating bath.

7. The method of claim 6 wherein said NMP comprises up to about 30% of the coagulating bath.

8. The method of claim 1 wherein said coagulating bath is acidic.

9. The method of claim 3 wherein the resulting fibers are doped to render them electrically conductive.

10. A method of preparing fibers of high molecular weight polyaniline comprising
   (a) providing partially crystalline polyaniline base;
   (b) substantially converting said polyaniline base to a protonic acid salt;
   (c) substantially reconverting said salt to a base, wherein said reconverted base is an amorphous, high molecular weight polyaniline base having a molecular weight of at least about 300,000 as determined by gel permeation chromatography; and
   (d) drawing a viscous solution of the product of step (c) into a fiber in a coagulating bath selected from the group consisting of non-solvents for said polyaniline and mixtures of solvents and non-solvents for said polyaniline, and allowing the drawn polyaniline to precipitate.

11. The product of claim 1.

12. The product of claim 10.

13. Polyaniline fibers prepared from a solution of polyaniline base in NMP which exhibits, upon gas permeation chromatography using a polystyrene standard, two peaks, the major peak having a molecular weight of at least about 300,000.

14. Fibers of claim 13 which exhibit a conductivity in the range of about 50 to 100 S/cm.

15. A method of using an amorphous polyaniline base having a molecular weight of at least about 300,000 as determined by gel permeation chromatography comprising drawing a viscous solution of said polyaniline base into a fiber in a coagulating bath selected from the group consisting of non-solvents for said polyaniline and mixtures of solvents and non-solvents for said polyaniline, and allowing the drawn polyaniline to precipitate.

* * * * *